US00RE44481E

(19) United States
(12) Reissued Patent
Murphy

(10) Patent Number: US RE44,481 E
(45) Date of Reissued Patent: Sep. 10, 2013

(54) APPAREL ACCESSORY HOLDER

(76) Inventor: Gerald P. Murphy, Dana Point, CA (US)

(21) Appl. No.: 13/015,463

(22) Filed: Jan. 27, 2011

Related U.S. Patent Documents

Reissue of:
(64) Patent No.: 7,481,340
Issued: Jan. 27, 2009
Appl. No.: 11/698,374
Filed: Jan. 26, 2007

U.S. Applications:
(63) Continuation-in-part of application No. 29/275,359, filed on Dec. 21, 2006, now Pat. No. Des. 558,497, and a continuation-in-part of application No. 29/236,657, filed on Aug. 19, 2005, now Pat. No. Des. 546,601.

(51) Int. Cl.
*A41D 27/22* (2006.01)

(52) U.S. Cl.
USPC ..... 223/85

(58) Field of Classification Search
USPC ..... 223/85, 87, 88, 97, DIG. 1, DIG. 4; 211/85.2, 85.3, 113, 118, 59.1; D8/373; D6/315, 328; 248/205.2
See application file for complete search history.

(56) References Cited

U.S. PATENT DOCUMENTS

| | | | | | |
|---|---|---|---|---|---|
| 2,314,643 | A | * | 3/1943 | Young | 223/92 |
| D190,608 | S | * | 6/1961 | Forrester | D8/372 |
| D195,751 | S | | 7/1963 | Kennedy et al. | |
| D197,146 | S | * | 12/1963 | Fisher | D6/315 |
| 4,327,836 | A | * | 5/1982 | Okuno | 211/74 |
| 4,387,873 | A | * | 6/1983 | Pavlo et al. | 248/227.1 |
| 4,749,604 | A | * | 6/1988 | Foster | 428/100 |
| 4,779,314 | A | * | 10/1988 | Aoki | 24/303 |
| 4,791,743 | A | * | 12/1988 | Kleinke | 40/322 |
| 4,799,587 | A | * | 1/1989 | Desanto | 206/37.6 |
| 4,947,987 | A | * | 8/1990 | Keenan | 206/292 |
| 5,117,988 | A | * | 6/1992 | Daniels | 211/113 |
| 5,137,149 | A | * | 8/1992 | Polacek | 211/113 |
| D339,979 | S | * | 10/1993 | Wehrley | D8/372 |
| D343,750 | S | * | 2/1994 | Wolf | D6/514 |
| 5,515,978 | A | * | 5/1996 | Moran | 211/30 |
| 5,515,981 | A | * | 5/1996 | Gregory et al. | 211/113 |
| 5,584,455 | A | * | 12/1996 | Artemi | 211/113 |
| D377,123 | S | | 1/1997 | Hutchens | |
| 5,647,101 | A | * | 7/1997 | Morita | 24/303 |
| D395,555 | S | * | 6/1998 | Ursitti | D6/328 |
| 5,779,033 | A | * | 7/1998 | Roegner | 206/6.1 |

(Continued)

*Primary Examiner* — Nathan Durham
(74) *Attorney, Agent, or Firm* — W. Patrick Quast, Esq.

(57) ABSTRACT

An apparel accessory holder is described. An elongated panel [is suspended by a hook] *includes a rod engaging mechanism such as a fixed or swiveling hook for suspending the panel* from a [standard] support rod *already in place, such as an in-closet rod*. One [side] *or both sides* of the panel [contains] *includes* a series of [hook and loop locking pads] *accessory holders* for securing heavy and bulky items such as handbags, [while the opposite side contains a series of gentle magnetic locking pads for delicate,] *and/or* amorphous items such as scarves. The [hook connection permits swiveling the panel left and right or up and down 360°] *rod engaging mechanism facilitates easy placement of the accessory holder on the closet rod with removal and replacement facilitated*. Written indicia guide the user to recommended storage procedures; and making one side softer to the touch provides an additional sensory direction to the user. The holder provides added convenience for apparel accessory storage and retrieval within the home, and for a variety of merchandise displays.

24 Claims, 7 Drawing Sheets

(56) References Cited

U.S. PATENT DOCUMENTS

| | | | | |
|---|---|---|---|---|
| D405,965 | S * | 2/1999 | Cardenas | D6/328 |
| 6,158,593 | A * | 12/2000 | Olsen | 211/14 |
| 6,223,910 | B1 | 5/2001 | Levin | |
| 6,722,538 | B1 * | 4/2004 | Autry et al. | 223/94 |
| D496,581 | S * | 9/2004 | Shaw et al. | D8/373 |
| 2005/0109802 | A1 * | 5/2005 | Avery et al. | 223/85 |

* cited by examiner

FIG. 7
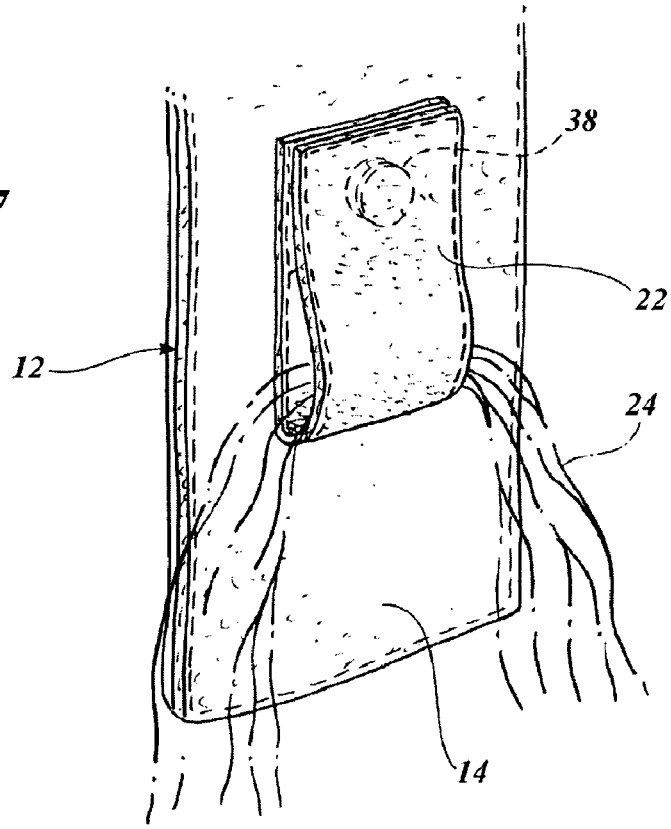
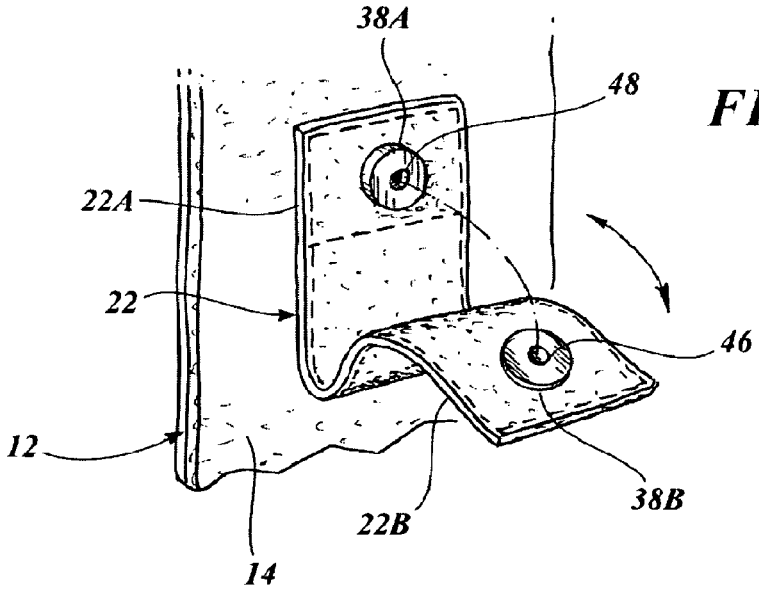
FIG. 8

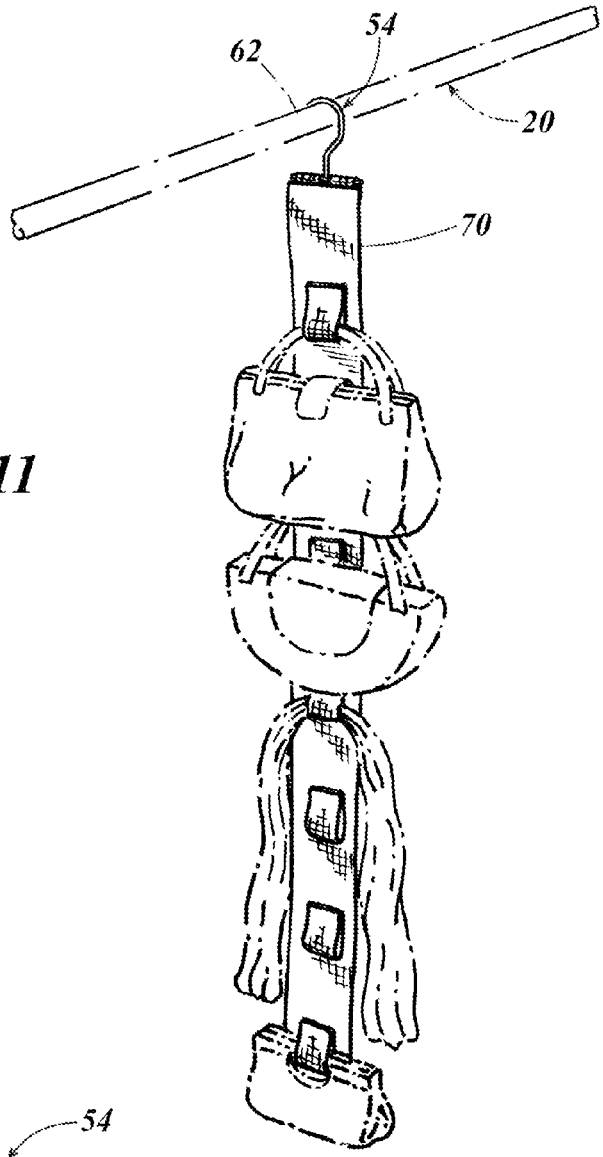
FIG. 11
NEW
FIG. 12
NEW
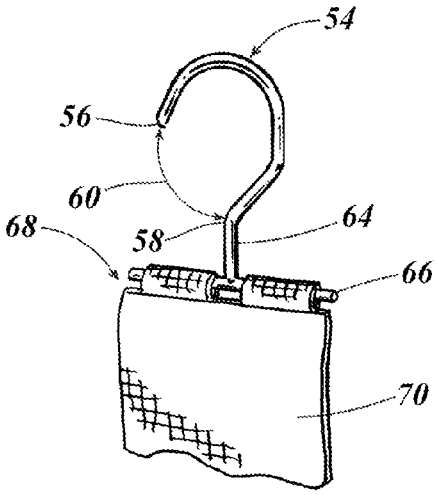

APPAREL ACCESSORY HOLDER

Matter enclosed in heavy brackets [ ] appears in the original patent but forms no part of this reissue specification; matter printed in italics indicates the additions made by reissue.

This [in] *is* a continuation in part of my applications, Ser. Nos. 29/236,657, titled "Accessory Holder", filed Aug. 19, 2005, now U.S. Pat. No. D.546,601; and 29/275,359, titled "Accessory Holder", filed Dec. 21, 2006, now U.S. Pat. No. D.558,497, which applications are herein incorporated by this reference.

This invention relates to devices and methods for hanging and/or displaying articles associated with wearing apparels, and in particular accessory items such as scarves and handbags.

BACKGROUND OF THE INVENTION

An everyday problem noted particularly by women is how to conveniently store and then access when necessary ubiquitous accessory apparel items, as, for example, scarves and handbags. Typical solutions include closet hangers; shelves, and the closet floor. Results are invariably aesthetically unpleasant and even potentially harmful to the articles being stored.

Obviously many attempts have been made to provide an answer to these common problems. For example, in U.S. Pat. No. 6,223,910 B1 a device for storing or displaying caps is disclosed. An elongated spine 10 having a hook 9 at one or both ends (FIG. 1) provides the means for securing and displaying a series of caps, such as baseball style caps, along the spine. The caps 13 are secured to the spine 10 by means of a clip 12 (FIG. 2). The spine can be either flexible or rigid, and positioned vertically or horizontally, or both at the same time.

In U.S. Pat. No. 5,515,981 a clothes hanger organizer is disclosed. A generally vertically disposed planar hanger 12 having a hook 14 at one end (FIG. 1) accommodates a series of horizontally positioned clothes hangers (41, 42, 43). The hangers are secured to clips 20 (FIG. 3) which are positioned a spaced distance apart in vertical alignment along the central axis of the panel, with the clips being connected to both sides of the panel (FIG. 1). The horizontal width of the panel is at least ⅓ the width of the largest hanger so as to prevent entanglement of the hangers.

Additional United States Patents illustrating similar approaches include: A Cap Holder, Des. 377,123; Garment Hanger Support, Des. 195,751; Combined Garment Bag Hook And Strap Therefore, Des. 339,979; Hair Bow And Head Band Hanger, Des. 343,750; Accessory Hanger, U.S. D 496,581 S.

While the above noted inventions describe a variety of useful methods and devices for dealing with storing and retrieving issues regarding apparels and related accessories, they do not envision the additional conveniences, aesthetic appeal, and economies in fabrication inherent in the present invention.

It is therefore a primary object of the present invention to provide for convenient and rapid storage and retrieval of apparel accessories.

A further object is to provide a convenient means for displaying at least [tow] *two* different merchandise categories in vertical, linear arrangement on a panel on both the front and rear sides of the panel.

An additional object is to provide for storage and retrieval of scarves on one side of the panel, and handbags on the other side of the panel.

Still another object of the invention is to provide for storage of scarves in a secure manner with minimum pressure being exerted on any portion of a secured scarf Yet another object is to provide a clear, aesthetic sense to the user, as well as written indicia as to the proper side of the panel for storing scarves, and the proper side of the panel for storing handbags.

A further object is to provide for virtually unlimited positional access for storage and retrieval of apparel accessories, even within the confines of a crowded closet.

SUMMARY OF THE INVENTION

These and other objects are obtained with the apparel accessory holder of the present invention.

As noted above storage of items of apparel and their related accessories is everyone's everyday problem. Particularly for bulky items such as handbags, and amorphous one's such as scarves, the problem becomes increasingly difficult. Further exacerbating the situation is the fact that these items are often expensive, and therefore deserve careful attention.

It occurred that structures analogous to merchandise displays and personal closet organizers could provide a unique answer for these common inconveniences. To this end an apparel accessory holder has been devised with convenient storage and retrieval facilities especially for scarves and handbags. The holder is comprised of an elongated panel having *a rod engaging mechanism such as* a hook at one end for securing to a typical closet rod. A plurality of connectors [for securing a handbag] are affixed to one [side] *or both sides* of the panel[, with a plurality of connectors for securing a scarf are affixed to the opposite side]. [In both cases the] *The* connectors are positioned a spaced distance apart and in vertical alignment along a substantially central axis of the panel. *The connectors are used to secure the accessory, such as a handbag or scarf, to the panel.*

[The] *If the rod engaging mechanism is a hook it can be either a fixed or rotatable hook. If a fixed hook configuration, the hook typically would be mounted to a cross member that extends left and right, from the connection to the vertical portion of the hook, along the top edge of the panel. If rotatable the* hook at the top of the panel has its linear descending portion secured through a hole in a tube rotatably affixed to the panel along the top width of the panel. Thus the hook is free to rotate a full 360° in a plane parallel to the panel when hanging in a vertical position, with the panel itself being free to rotate 360° up or down in reference to a securing rod which will be more fully explained below.

The panel can be either rigid or flexible, with flexible construction preferred for mounting in a typical closet. Materials of fabrication can include metal, wood, or plastic, with cloth preferred for flexibility as note above. One side of the panel can have the written indicia "SCARVES", and on the other side "BAGS". In addition, the panel can be fabricated using two different types of cloth as, for example, canvas on one side and suede on the other. The canvas side would contain the handbag connectors, while the softer suede side would contain the scarf connectors. In this manner users would not only have the written indicia as to the correct placement of accessories on the panel, but also an aesthetic "feel" guiding the proper placement of an item.

Connectors for securing handbags can be, for example, hook and loop locking pads positioned in vertical alignment. Each pad containing a hook section at one end and a loop section at its other end can be affixed to one side of the panel in any convenient manner, such as via adhesives, sewing, molded within a plastic panel, and so on. To secure a hand bag the hook and loop locking pad is simply flipped open, the loop section of the handbag holder placed within the base of the hook and loop locking pad, and finally the hook and loop sections are re-secured to firmly hold the handbag.

For securing scarves on [the other side of] the panel a magnetic locking pad can be employed. Once again these special types of connectors are secured in vertical alignment. The magnetic locking pads can be affixed to one [side] *or both sides* of the panel in any convenient manner as noted above for the hook and loop locking pads. The magnetic locking pad is comprised of a first magnet secured at one end, with a second matching magnet secured at its other end. When the two matching magnets are brought into close proximity their magnetic attraction causes them to snap firmly together, securing an item such as a scarf placed therebetween. To add additional security the first magnet can have a matching cavity to a projecting nub at the center of the second magnet. A significant feature of the magnetic securing arrangement, particularly for delicate and expensive items such as a valued scarf, is that while the item is firmly secured any portion caught up in the locking mechanism is subject only to extremely gentle pressure. And even if accidentally pulled from a magnetically locked pad the item will be quickly and gently released without harm.

BRIEF DESCRIPTION OF THE DRAWINGS

FIG. 7 is a fragmentary view of one side of an apparel accessory holder, showing a magnetic locking pad in closed position securing a scarf shown in phantom.

FIG. 8 is a fragmentary view of one side of an apparel accessory holder, showing a magnetic locking pad in open position.

*FIG. 11 is a perspective view of a single-sided version of the apparel accessory holder of the invention, showing the holder suspended from an in-place closet rod with scarves and handbags shown in phantom on the single-side.*

*FIG. 12 is a fragmentary view of a fixed hook version of the rod engaging mechanism for the apparel accessory holder of the invention.*

DESCRIPTION OF THE PREFERRED EMBODIMENT

Figure 1:
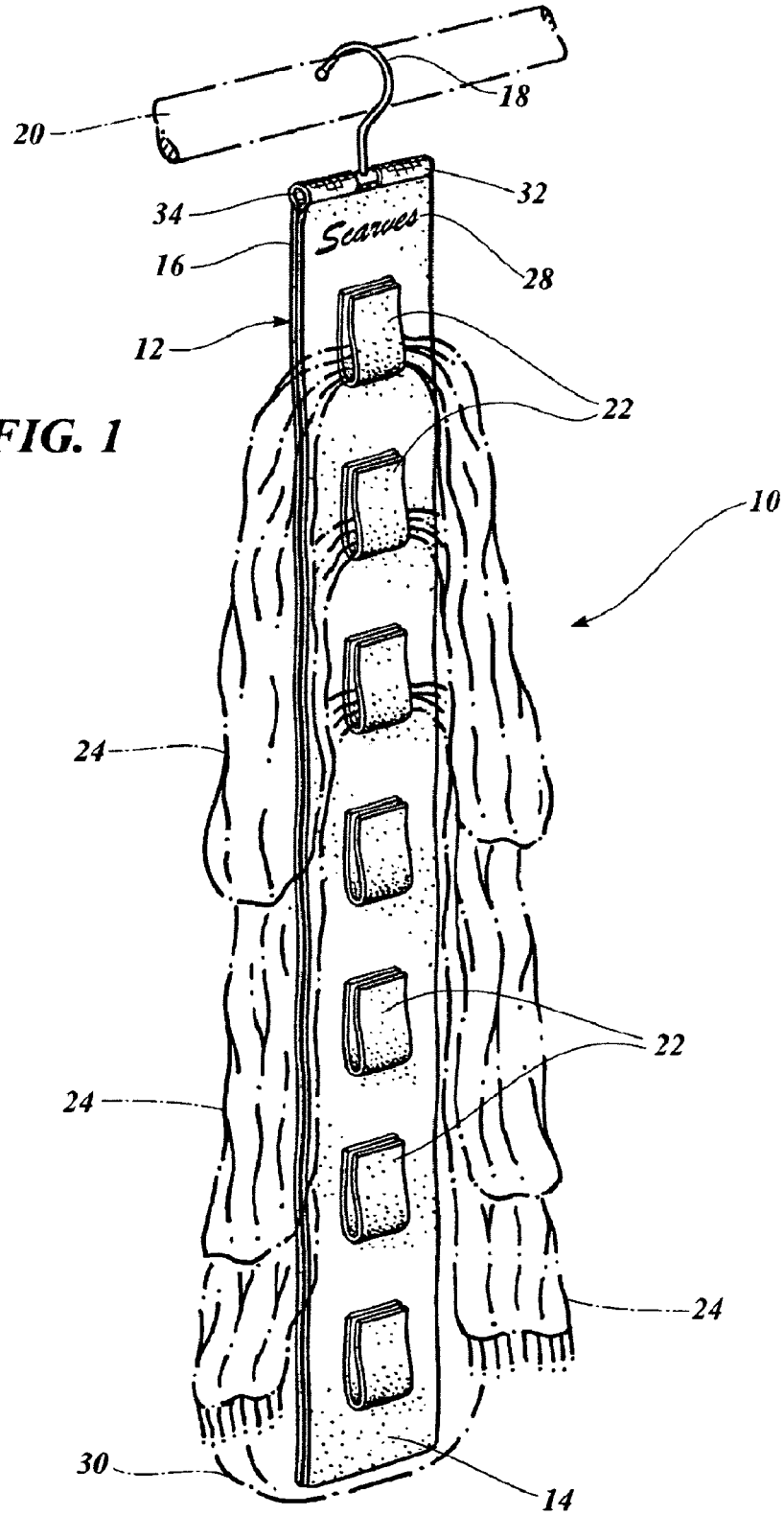
FIG. 1 is a perspective view of one version of the apparel accessory holder of the invention, showing the holder secured to a closet rod with scarves shown in phantom as attached to one side of the holder.
Figure 2:
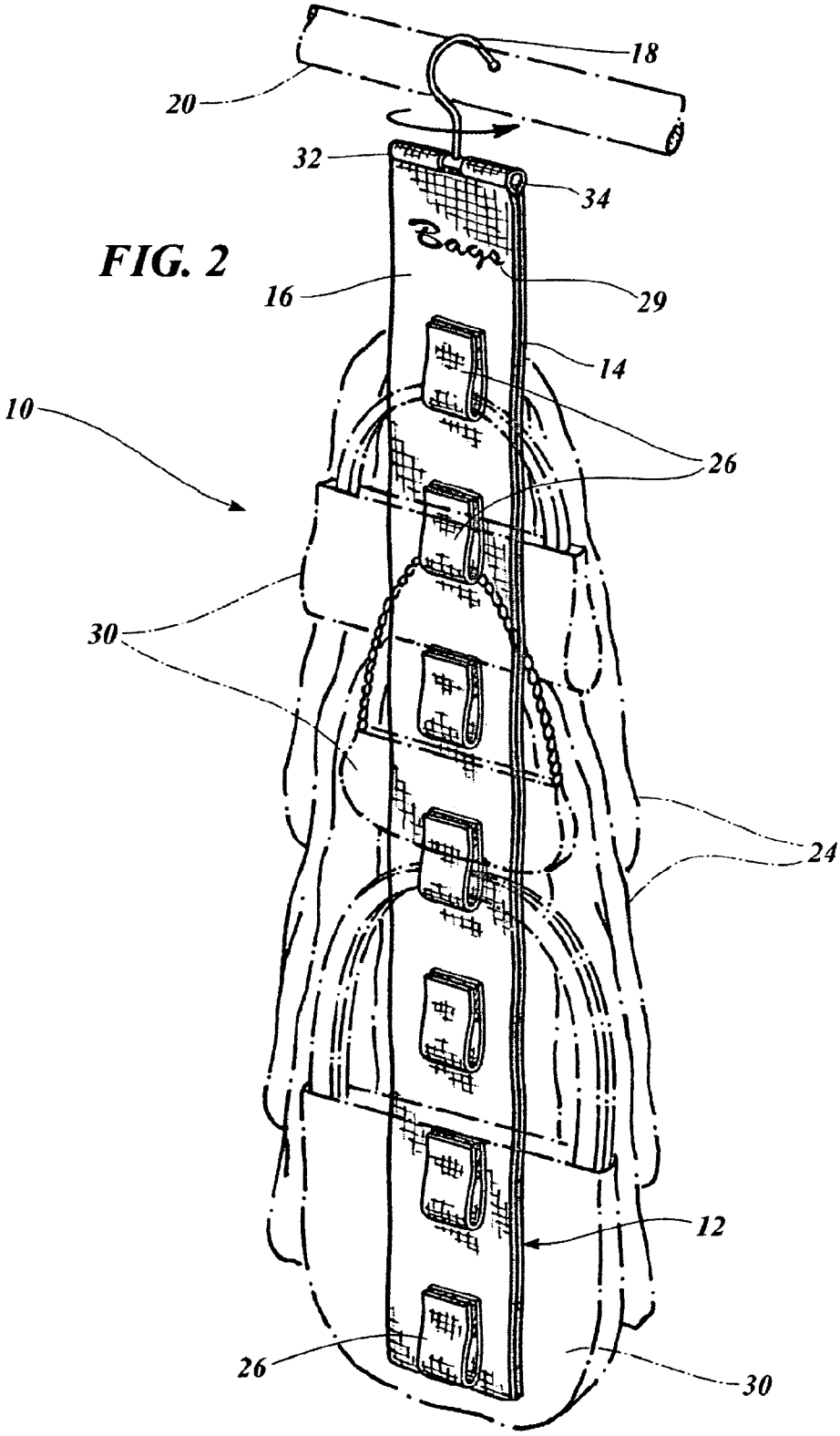
FIG. 2 is a view similar to that of FIG. 1 showing the holder swiveled through a 180° angle to show the opposite side of the holder, with both handbags and scarves shown in phantom as attached to the holder.

Turning now to the drawings wherein similar structures having the same function are denoted with the same numeral, in FIGS. 1 and 2 a version of the apparel accessory holder 10 of the invention is depicted. The holder 10 is comprised of an elongated panel 12 having *a rod engaging mechanism such as* a hook 18 affixed at one end of the panel. Typical dimensions for the holder can be approximately, for example, 45" in length×3½" wide×⅛" in thickness. The holder can be fabricated in a variety of materials at designer preference, with rigid plastic or metal preferable for the hook 18. The panel itself can be fabricated in rigid materials including wood, metal, or plastic, but preferably in a flexible cloth or plastic.

The hook, *for example, 54 in FIG. 12,* at the top of the holder is *either fixed as shown in FIG. 12, or* rotatably affixed approximately midway along the width of the panel [for convenient connection to a closet rod 20 or similar support structures that may be employed for merchandise displays. Once]. *Whether fixed or rotatable, the hook includes a first segment 56 and a second segment 58. Together they define an opening, indicated by the arcuate arrow 60. The opening 60 is of sufficient breadth that a support rod, such as the in-place closet rod 20, will pass through the opening. Once the rod is disposed inside the area defined by the hook contour and opening 60, a portion of the inner surface of the hook contacts the upper surface 62 of the rod 20 to provide support for the accessory holder. Thus easy placement, removal and replacement on the support rod 20 is accommodated even though the ends of the rod may not be accessible. This configuration of the hook member and interplay with the support rod, once again, is identical for the rotatable hook 18. The hook 54 has a vertical portion 64 which is fixedly secured by a weld, for example, to a cross member 66 that extends left or right from the vertical portion 64 along the top edge 68 of the panel 70. With the rotatable hook connection, and the hook 18* connected to a rod 20, *the top edge of* the panel 12 can be rotated 360° in a plane parallel to the [rod, or] *rod; or the panel can be rotated,* up and down 360° in relation to the rod as will be more fully explained.

[Both] *One or both* sides of the panel 12 have a series of accessory connectors positioned a spaced distance apart along substantially the central axis of the panel. *FIG. 11 shows a single sided panel 70.* A first side 14 can have, for example, a plurality of magnetic locking pads 22 (FIGS. 7-8), specifically for securing apparel accessories such as scarves. The second side 16 similarly has a plurality of accessory connectors, as, for example, hook and loop locking pads 26 (FIGS. 9-10), specifically for securing apparel accessories such as handbags. *Either side, or the single sided version, can include a mix of the differently structured accessory connectors to accommodate handbags and scarves, or the like, on one or both sides.*

Figure 3:
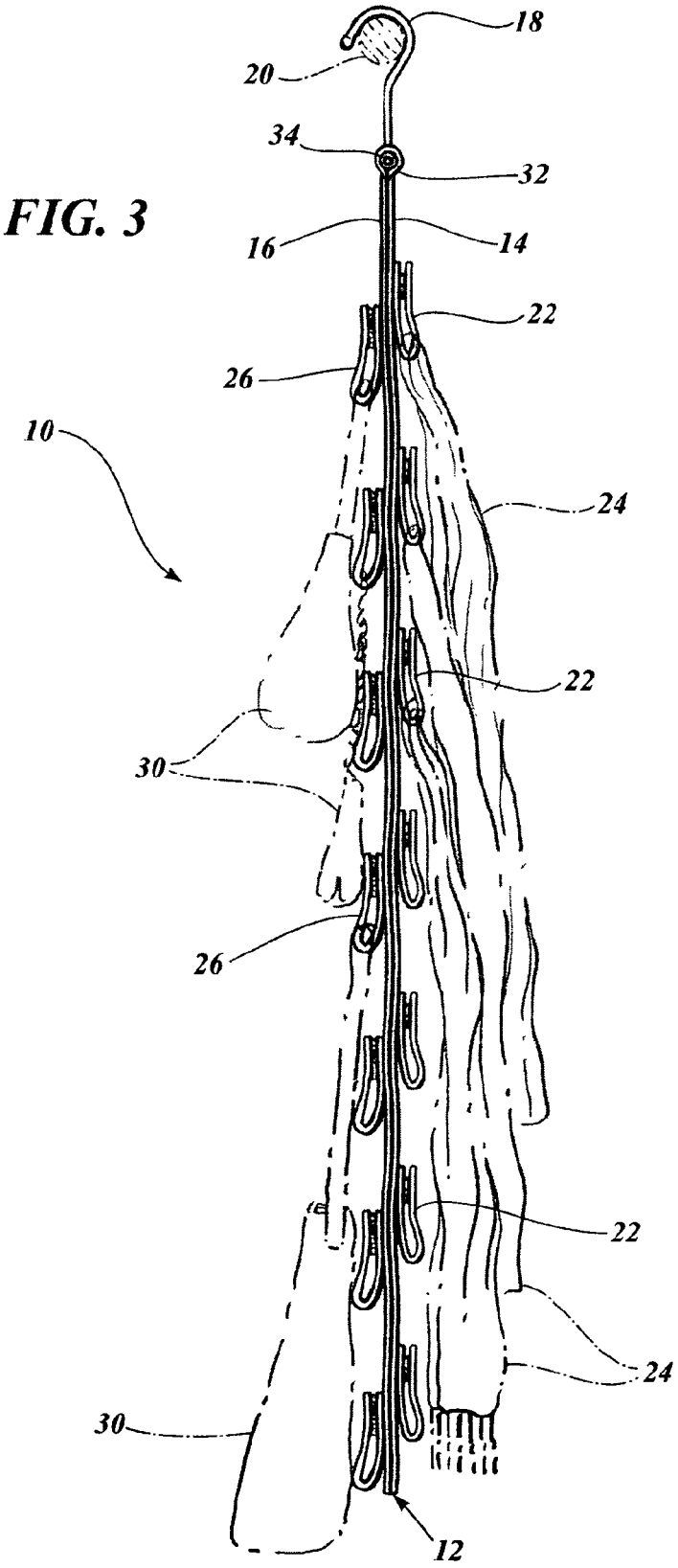
FIG. 3 is a side elevational view of one version of the apparel accessory holder of the invention, illustrating hook and loop locking pads on one side and magnetic locking pads on the opposite side, with secured hand bags and scarves shown in phantom.

As best seen in FIG. 3, once the holder 10 is in place on a support rod 20 the panel provides for convenient storage and retrieval of scarves 24 held in place by magnetic latch 38 secured to magnetic locking pads 22 on one side 14 of the panel; and of handbags 30 held in place by hook and loop combination 36 secured to hook and loop locking pads 26 on the opposite side 16 of the panel. Written indicia 28, FIG. 2, are provided directing users to the correct placement of items on the holder. In addition, the construction of the holder 10 can assist in its proper utilization. Using cloth as the material of fabrication, two types of cloth can be employed, as, for example, canvas and suede. Canvas could be used on one side of the panel for securing handbags, while softer suede could be used on the opposite side for securing scarves. In this manner the user is guided by the aesthetic feel of the panel to recommended accessory connectors.

Figure 4:
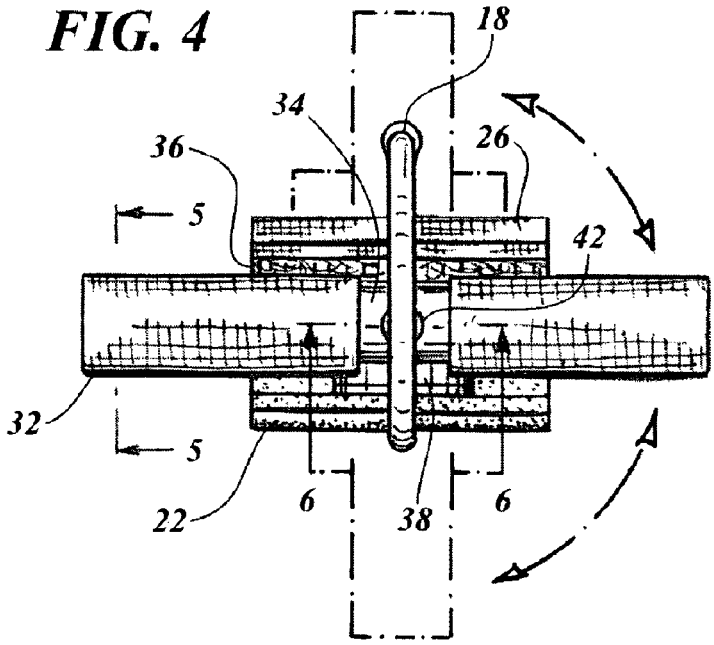
FIG. 4 is a top plan fragmentary view of the multi-positionable hook connector for the apparel accessory holder of the invention, illustrating the degree of motion imparted to the holder by the hook connection.
Figure 5:
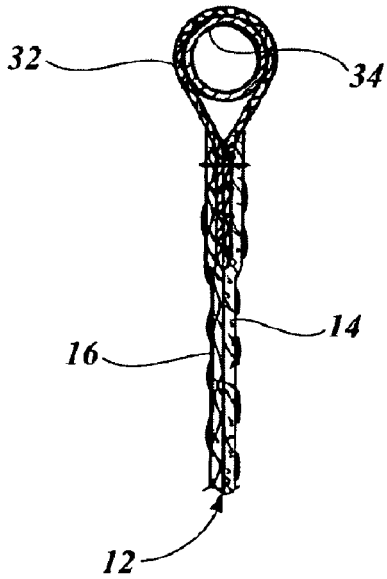
FIG. 5 is a sectional view taken along the line 5-5 of FIG. 4, illustrating the rotatable tube support for the hook connection of the apparel accessory holder.
Figure 6:
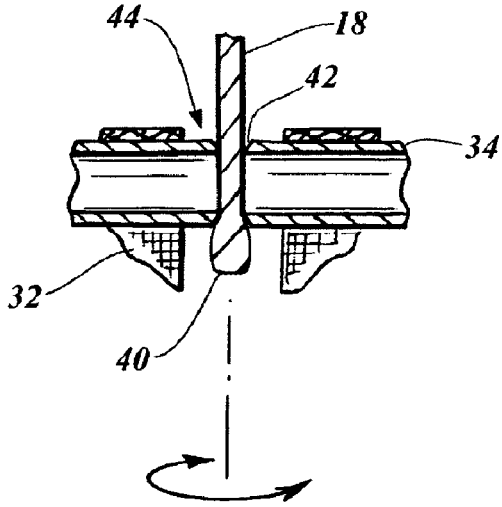
FIG. 6 is a sectional view taken along the line 6-6 of FIG. 4, illustrating the base linear section of the hook as rotatably secured within an aperture in the tube support.

FIGS. 4, 5, and 6 illustrate the connection of the multi-positionable hook 18 to the panel 12. Two identical left and right tubular sections 32 affixed at the top of the panel provide the means for securing a rigid tube 34 across the width of the panel top. The tubular sections 32 are connected to the panel top so as to leave a centrally positioned space 44 between the two sections. The rigid tube 34 is secured within the two sections, the tube 34 having a centrally positioned aperture 42 for securing the linear downward shaft portion of the hook 18, the end 40 of this linear shaft portion having a greater diameter than the diameter of the tube aperture. In this manner, when the hook 12 is connected to a support rod 20 the panel is free to move up or down 360° due to the rotation of the rigid tube 34 in the tubular sections 32; and the space 44 between the left and right tubular sections 32. And, of course, the aperture 42 within the rigid tube permits a full 360° rotation of the *top edge of the* panel in a plane parallel to the rod *20*.

FIGS. 7 and 8 illustrate magnetic locking pads 22 considered especially suitable for delicate items such as scarves. The magnetic locking pads can be fabricated in the same material as used for the side 14 of the panel. The magnetic locking pad is divided into a top section 22A affixed to the panel in any convenient manner, and a confluent freely suspended bottom section 22B. A centrally positioned first magnet 38A having a center cavity 48 is affixed to the top section 22A, and a matching centrally positioned second magnet 38B having a protruding center nub 46 is affixed to the bottom section 22B. In use a scarf 24 is placed between the top and bottom sections which are then moved into close proximity to each other, causing the magnetically attracted magnets to snap together, firmly securing the scarf. It is important to note that even if a portion of the scarf is caught between the two magnets, the gently pressure will not harm the scarf. And even if the scarf is accidentally pulled out of the magnetic locking pad, the mechanism releases without harm to the scarf.

Figure 9:
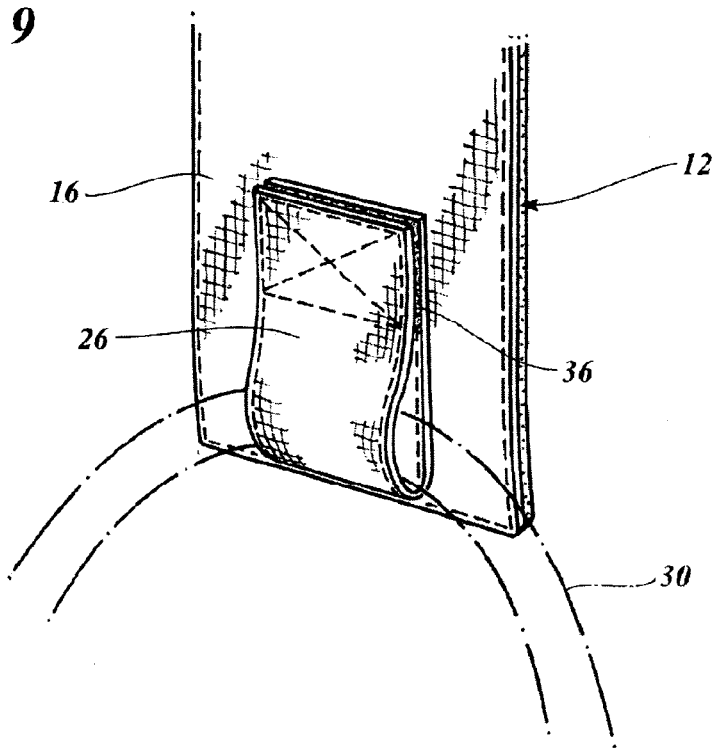
FIG. 9 is a fragmentary view of one side of an apparel accessory holder, showing a hook and loop locking pad in closed position, securing a handbag loop connector shown in phantom.
Figure 10:
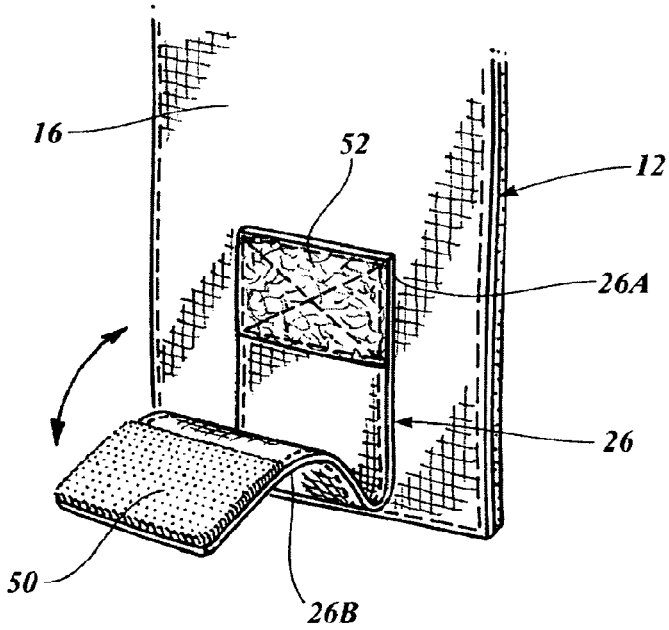
FIG. 10 is a fragmentary view of one side of an apparel accessory holder, showing a hook and loop locking pad in open position.

FIGS. 9 and 10 illustrate a hook and loop locking pad 26 considered especially useful for conveniently securing and retrieving handbags. As noted above for the magnetic locking pad, the hook and loop locking pad 26 consists of a top section 26A which is affixed in any convenient manner to one side 16 of the panel, and a confluent freely suspended bottom section 26B. The top section 26A has a loop area 52 attached across its width, while the bottom section 26B has a hook area 50 attached across its width. In use the handle of the handbag is simply placed between the hook and loop sections, and the top section 26A and bottom section 26B are then simply pressed together to secure the hand bag.

As is clear from the above disclosure a convenient new device and method for dealing with difficult to store apparel accessory items such as hand bags and scarves is provided. The holder 10 of the present invention significantly simplifies the storage and retrieval of handbags and scarves in a user's typically overcrowded closet. The universally positionable hook attachment provides for easy connection and removal of these bulky items. It should be noted that while primarily useful for the average home, the unique features of the holder lends itself to a variety of merchandise displays *where access to the ends of the display rods are not accessible and where placement, removal and replacement is preferably facilitated*. And while considered particularly useful for securing handbags and scarves the described panel accessory connectors can obviously be employed by users in ways to numerous to list.

While the present invention has been disclosed in connection with versions shown in detail, various modification and improvements will become readily apparent to those skilled in the art. Accordingly, the spirit and scope of the present invention is to be limited only by the following claims.

What is claimed is:

1. An apparel accessory holder, comprising:

(a) an elongated panel, said panel being substantially greater in length than in width, said panel having a top and bottom, said panel having a first side and a second side, said panel having a rotational axis centrally disposed along the length of said panel from said top to said bottom;

(b) said panel having a first plurality of accessory connectors affixed to said first side of said panel, and a second plurality of accessory connectors affixed to said second side of said panel;

each of said accessory connectors including a first end and a second end, each of said accessory connectors including a third side and a fourth side, said third side of each of said accessory connectors juxtaposed to a respective surface portion of said first side or said second side of said panel, a portion of each of said accessory connectors irremovably secured to said panel;

(c) first and second cooperatively engaging means irremovably secured on said fourth side in near proximity to said first end and said second end respectively, said first and second cooperatively engaging means functioning so as to detachably secure said first end to said second end of a respective accessory connector to thereby form a loop of said respective accessory connector so as to suspend an accessory therefrom, the remaining surface portion of said fourth side, other than in the location of said first end and said second end whereat said first and second cooperatively engaging means are disposed, consisting of a substantially smooth surface; and (d) a rigid hook being rotatably connected to said top of said panel, said rigid hook including a shaft portion, said rigid hook's rotatable connection having means for permitting said panel to be swiveled from left to right about said rotational axis, said means for permitting the swiveling of said panel including a first member secured to the panel along an axis perpendicular to said rotational axis, said first member including a centrally positioned aperture centered at the point where said rotational axis intersects said first member, said shaft portion rotatably secured within said aperture whereby said panel may be positioned at any angular increment about said rotational axis including 90°, 180°, 270° and 360°.

2. The apparel accessory holder according to claim 1 wherein said first and second cooperatively engaging means of said first plurality of accessory connectors affixed to said first side of said panel are hook and loop locking pads.

3. The apparel accessory holder according to claim 1 wherein said first and second cooperatively engaging means of said second plurality of accessory connectors affixed to said second side of said panel are magnetic locking pads.

4. The apparel accessory holder according to claim 3 wherein each of said magnetic locking pads contains a first magnet and matching second magnet, said first magnet containing a centrally positioned cavity for accepting a centrally positioned nub protrusion on said second magnet, said cavity and said nub cooperating to further secure said magnetic locking pad in closed position when said magnets are brought into close proximity.

5. The apparel accessory holder according to claim 1 wherein said panel is fabricated in a flexible material.

6. The apparel accessory holder according to claim 5 wherein said flexible material is cloth.

7. The apparel accessory holder according to claim 1 where in said first side and said second side of said panel have written indicia guiding a user to recommended areas for placement of items on said panel.

8. The apparel accessory holder according to claim 1, further comprising said second side of said panel being fabricated in a softer material than said first side so as to provide a user with a sensory feel acting as a guide to recommended placement of items on said panel.

9. The apparel accessory holder according to claim 1 wherein said first member is a rigid tube affixed within matching left and right side positioned tubular sections at said top of said panel having a space therebetween, said rigid tube having said centrally positioned aperture through which said shaft portion of said hook is rotatably secured, so that when said rigid hook is secured to said support rod a user may swivel said top of said panel 360° in a plane parallel to said support rod, said space between said left and said right side positioned tubular sections securing said rigid tube further permitting a user to lift said panel up or down 360° in relation to said support rod.

10. An apparel accessory holder, comprising:

(a) an elongated panel, said panel being substantially greater in length than in width, said panel having a top and bottom, said panel having a first side and a second side;

said panel having a plurality of heavy weight accessory connections affixed a spaced distance apart along a substantially central axis of said first side of said panel, and a plurality of light weight connectors affixed a spaced distance apart along a substantially central axis of said second side of said panel;

each of said heavy weight and light weight accessory connectors including a first end and a second end, each of said accessory connectors including a third side and a fourth side, said third side of each of said accessory connectors juxtaposed to a respective surface portion of said first side or said second side of said panel, a portion of each of said accessory connectors irremovably secured to said panel;

(c) first and second cooperatively engaging means irremovably secured on said fourth side in near proximity to said first end and said second end respectively, said first and second cooperatively engaging means functioning so as to detachably secure said first end to said second end of a respective accessory connector to thereby form a loop of said respective accessory connector so as to suspend an accessory therefrom, the remaining surface portion of said fourth side, other than in the location of said first end and said second end whereat said first and second cooperatively engaging means are disposed, consisting of a substantially smooth surface; and (d) a rigid hook being rotatably connected to a rigid tube disposed at said top of said panel, said rigid hook further including a shaft portion, said rigid tube comprising a left and right side positioned tubular section and a centrally positioned aperture, said rigid hook's rotatable connection formed by rotatably securing said shaft portion of said hook through said centrally positioned aperture, so that when said rigid hook is secured to said support rod a user may swivel said top of said panel 360° in a plane parallel to said support rod, said space between said left and said right side positioned tubular sections securing said rigid tube further permitting a user to lift said panel up or down 360° in relation to said support rod.

11. The apparel accessory holder according to claim 10 wherein said first and second cooperatively engaging means of said heavy weight accessory connectors on said first side are hook and loop locking pads.

12. The apparel accessory holder according to claim 10 wherein said first and second cooperatively engaging means of said light weight accessory connectors are magnetic locking pads.

13. A method for storing both heavy and light weight apparel accessory items, comprising the steps of:

(a) creating an elongated panel having a first side and a second side, and a top and a bottom, said panel having a rotational axis centrally disposed along the length of said panel from said top to said bottom;

(b) connecting a multi-positional hook having a shaft portion and a first member, said first member secured to said top of said panel, said first member including a centrally positioned aperture centered at the point where said rotational axis intersects said first member, said shaft portion rotatably secured within said aperture whereby said panel may be positioned at any angular increment about said rotational axis including 90°, 180°, 270° and 360°;

(c) affixing a plurality of heavy weight accessory connectors a spaced distance apart on said first side of said panel, and affixing a plurality of light weight accessory connectors a spaced distance apart on said second side of said panel;

each of said heavy weight and light weight accessory connectors including a first end and a second end, each of said accessory connectors including a third side and a fourth side, said third side of each of said accessory connectors juxtaposed to a respective surface portion of said first side or said second side of said panel, a portion of each of said accessory connectors irremovably secured to said panel;

(d) irremovably securing first and second cooperatively engaging means on said fourth side in near proximity to said first end and said second end respectively, said first and second cooperatively engaging means functioning so as to detachably secure said first end to said second end of a respective accessory connector to thereby form a loop of said respective accessory connector so as to suspend an accessory therefrom, the remaining surface portion of said fourth side, other than in the location of said first end and said second end whereat said first and second cooperatively engaging means are disposed, consisting of a substantially smooth surface; and (e) securing said hook to a support rod; and (f) fastening at least one of said heavy weight apparel accessory items to a respective at least one of said heavy weight accessory connectors on said first side of said panel, and fastening at least one of said light weight apparel accessory items to a respective at least one of said light weight accessory connectors on said second side of said panel.

14. The method according to claim 13 wherein said panel is fabricated in a flexible material.

15. The method according to claim 13 wherein said first and second cooperatively engaging means of said heavy weight accessory connectors are hook and loop locking pads.

16. The method according [the] *to* claim 13 wherein said first and second cooperatively engaging means of said light weight accessory connectors are magnetic locking pads.

*17. An apparel accessory holder, adapted for suspension from an in-place support rod, the holder comprising:*

*(a) an elongated panel, said panel being substantially greater in length than in width, said panel having a top and bottom, said panel having a first side and a second side, said panel having a rotational axis centrally disposed along the length of said panel from said top to said bottom;*

*(b) said panel having at least a first grouping of accessory connectors affixed to said first side of said panel;*

*(c) said panel having at least a second grouping of accessory connectors affixed to said second side of said panel;*

*each of said accessory connectors in said first grouping and said second grouping including a first end and a second end, each of said accessory connectors including a third side and a fourth side, said third side of each of said accessory connectors juxtaposed to a respective surface portion of said first side or said second side of said panel, a portion of each of said accessory connectors irremovably secured to said panel;*

*(d) first and second cooperatively engaging elements irremovably secured on said fourth side in near proximity to said first end and said second end respectively, said first and second cooperatively engaging elements functioning so as to detachably secure said first end to said second end of a respective accessory connector to thereby form a loop of said respective accessory connector so as to suspend an accessory therefrom;*

*(e) a tubular section affixed at the top of said panel; and*

*(f) a support rod engaging mechanism connected to said tubular section, said rod engaging mechanism including first and second segments, said first and second segments cooperating to define an opening, said tubular section and said connected, support rod engaging mechanism cooperatively connected to each other so as to permit the rotation of said panel, clockwise or counterclockwise, an angular amount up to at least 90° about said rotational axis.*

*18. The apparel accessory holder according to claim 17 wherein said rod engaging mechanism is a hook member configured to include said first and second segments.*

*19. The apparel accessory holder according to claim 17 wherein at least some of said first and second cooperatively engaging elements of either said first or second grouping of accessory connectors are hook and loop locking pads.*

*20. The apparel accessory holder according to claim 17 wherein at least some of said first and second cooperatively engaging elements of either said first or second grouping of accessory connectors are magnetic locking pads.*

*21. The apparel accessory holder according to claim 20 wherein each of said magnetic locking pads contains a first magnet and matching second magnet, said first magnet containing a centrally positioned cavity for accepting a centrally positioned nub protrusion on said second magnet, said cavity and said nub cooperating to further secure said magnetic locking pad in closed position when said magnets are brought into close proximity.*

*22. The apparel accessory holder according to claim 17, further comprising said second side of said panel being fabricated in a softer material than said first side so as to provide a user with a sensory feel acting as a guide to recommended placement of items on said panel.*

*23. The apparel accessory holder according to claim 17 wherein said rod engaging mechanism is a hook member rotatably connected to said top of said panel, said hook member configured to include said first and second segments.*

*24. The apparel accessory holder according to claim 17 wherein the remaining surface portion of said fourth side of at least some of said accessory connectors, other than in the location of said first end and said second end whereat said first and second cooperatively engaging elements are disposed, is a smooth surface.*

* * * * *